US008818651B2

(12) United States Patent
Joung et al.

(10) Patent No.: US 8,818,651 B2
(45) Date of Patent: Aug. 26, 2014

(54) FLOW CONTROL SYSTEM FOR A HYDRAULIC PUMP OF CONSTRUCTION MACHINERY

(75) Inventors: Hea-Gyoon Joung, Busan (KR); Sang-Hee Lee, Changwon-si (KR); Hung-Ju Shin, Changwon-si (KR)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 13/700,980

(22) PCT Filed: Jun. 28, 2010

(86) PCT No.: PCT/KR2010/004176
§ 371 (c)(1),
(2), (4) Date: Nov. 29, 2012

(87) PCT Pub. No.: WO2012/002586
PCT Pub. Date: Jan. 5, 2012

(65) Prior Publication Data
US 2013/0103270 A1 Apr. 25, 2013

(51) Int. Cl.
*G06F 19/00* (2011.01)
*F15B 15/00* (2006.01)
*F04B 49/00* (2006.01)

(52) U.S. Cl.
USPC .................. 701/50; 60/431; 60/445; 60/452; 417/213

(58) Field of Classification Search
CPC ........ A01B 71/063; E02F 9/22; E02F 9/2221; E02F 9/2235; E02F 9/2285; E02F 9/2296; E02F 9/2292; F15B 11/055; F15B 11/6309; F15B 13/043; F15B 2211/6316; F15B 2211/6309; F15B 9/08; F15B 9/2292
USPC ................ 701/50; 60/431, 445, 452; 417/213
See application file for complete search history.

(56) References Cited

U.S. PATENT DOCUMENTS 5,083,430 A * 1/1992 Hirata et al. .................... 60/445
5,134,853 A * 8/1992 Hirata et al. .................... 60/420
(Continued)

FOREIGN PATENT DOCUMENTS

JP 2002-326799 A 11/2002
JP 2006-112280 A 4/2006
(Continued)

OTHER PUBLICATIONS

International Search Report (in Korean with English translation) and Written Opinion of the International Searching Authority (in Korean) for PCT/KR2010/004176, mailed Mar. 25, 2011; ISA/KR.

(Continued)

*Primary Examiner* — Fadey Jabr
*Assistant Examiner* — Angelina Shudy
(74) *Attorney, Agent, or Firm* — Harness, Dickey & Pierce, P.L.C.

(57) ABSTRACT

A flow control system for a hydraulic pump of a construction machine that can variably control a discharge flow rate of the hydraulic pump in accordance with load pressure generated by a hydraulic actuator. According to the system, the discharge pressure of the hydraulic pump and the operation rate of the operation lever for the hydraulic actuators is detected, and standard load pressures of the respective hydraulic actuators are set. If the discharge pressure of the hydraulic pump is higher than preset load pressures of the hydraulic actuators, the discharge flow rate of the hydraulic pump is reduced in proportion to the operation rate in accordance with degrees of loads generated by the hydraulic actuators. If the discharge pressure of the hydraulic pump is lower than the standard load pressures of the hydraulic actuators, the discharge flow rate of the hydraulic pump is controlled in proportion to the operation rate.

6 Claims, 2 Drawing Sheets

(56) References Cited

U.S. PATENT DOCUMENTS

| | | | | |
|---|---|---|---|---|
| 5,155,996 | A | 10/1992 | Tatsumi et al. | |
| 5,177,964 | A * | 1/1993 | Tanaka et al. | 60/445 |
| 5,267,440 | A * | 12/1993 | Nakamura et al. | 60/426 |
| 5,630,317 | A * | 5/1997 | Takamura et al. | 60/445 |
| 6,308,516 | B1 * | 10/2001 | Kamada | 60/450 |
| 7,431,101 | B2 * | 10/2008 | Hacker | 172/2 |
| 7,487,609 | B2 * | 2/2009 | Nakamura et al. | 37/348 |
| 7,543,448 | B2 | 6/2009 | Nakamura et al. | |
| 7,779,630 | B2 * | 8/2010 | Sakamoto | 60/445 |
| 8,327,638 | B2 * | 12/2012 | Ohtsukasa | 60/445 |
| 2003/0019209 | A1 * | 1/2003 | Tsuruga et al. | 60/459 |
| 2006/0229787 | A1 * | 10/2006 | Kurup et al. | 701/50 |
| 2007/0012039 | A1 * | 1/2007 | Takebe | 60/449 |
| 2007/0125078 | A1 * | 6/2007 | Tanaka et al. | 60/421 |
| 2008/0245065 | A1 | 10/2008 | Nakamura et al. | |
| 2010/0170239 | A1 * | 7/2010 | Sora | 60/459 |
| 2013/0098021 | A1 * | 4/2013 | Shin et al. | 60/328 |
| 2013/0121852 | A1 * | 5/2013 | Joung et al. | 417/213 |
| 2013/0263583 | A1 * | 10/2013 | Shin | 60/327 |
| 2013/0318971 | A1 * | 12/2013 | Sora | 60/711 |
| 2014/0000252 | A1 * | 1/2014 | Sora | 60/431 |

FOREIGN PATENT DOCUMENTS

| | | | |
|---|---|---|---|
| KR | 10-1993-0009513 | B1 | 10/1993 |
| KR | 10-2002-0006607 | A | 1/2002 |
| KR | 20030087247 | A * | 5/2002 |
| KR | 10-0651695 | B1 | 11/2006 |

OTHER PUBLICATIONS

International Preliminary Report on Patentability (in Korean) for PCT/KR2010/004176, dated Oct. 9, 2012; IPEA/KR.

* cited by examiner

FLOW CONTROL SYSTEM FOR A HYDRAULIC PUMP OF CONSTRUCTION MACHINERY

TECHNICAL FIELD

The present invention relates to a flow control system of a hydraulic pump provided in a construction machine such as an excavator. More particularly, the present invention relates to a flow control system of a hydraulic pump for a construction machine, which can variably control a discharge flow rate of a variable displacement hydraulic pump (hereinafter referred to as a "hydraulic pump") in accordance with load pressure generated in a hydraulic actuator such as a boom cylinder.

BACKGROUND ART

In general, a hydraulic construction machine controls the flow rate of a hydraulic pump in accordance with the operation rate of an operation lever (which means pilot signal pressure that is supplied to a spool in proportion to the operation amount of the operation lever to shift the spool that controls the flow of hydraulic fluid) in order to save energy.

In the related art, the relationship between the operation rate and the discharge flow rate of a hydraulic pump is constant regardless of load pressure. That is, in the case of controlling the discharge flow rate regardless of the load pressure, a large amount of hydraulic fluid is discharged from the hydraulic pump even when middle or high load is generated, and thus a loss of the flow rate and pressure occurs to cause the occurrence of energy loss.

On the other hand, during working using an excavator or the like, hydraulic flow of a desired flow rate is discharged in proportion to the operation rate of the operation lever in the case where work is done with load pressure that is lower than a standard load pressure at which the range of change of the discharge flow rate is wide and an accurate control is required.

By contrast, during working with load pressure that is higher than the standard load pressure, that is, in the case of lifting and moving a heavy object slowly, a high flow rate is unnecessary and the change of the flow rate is not great. During excavating and carrying work, the operation rate rapidly reaches the maximum level. Accordingly, during working with load pressure that is higher than the standard load pressure, the correction of the relationship between the operation rate and the discharge flow rate according to the load pressure do not cause a great change in operation feeling.

DISCLOSURE

Technical Problem

Therefore, the present invention has been made to solve the above-mentioned problems occurring in the related art, and one embodiment of the present invention is related to a flow control system of a hydraulic pump for a construction machine, which can reduce the loss of the discharge flow rate and the pressure loss of the hydraulic pump in accordance with the load pressure during working with the load pressure that is higher than the standard load pressure.

Technical Solution

In accordance with one aspect of the present invention, there is provided a flow control system of a hydraulic pump for a construction machine including a variable displacement hydraulic pump, at least one hydraulic actuator connected to the hydraulic pump, a spool controlling hydraulic fluid supplied to the hydraulic actuator when shifted by signal pressure that is supplied in proportion to an operation rate of an operation lever, a detection sensor detecting discharge pressure of the hydraulic pump, a detection sensor detecting signal pressure according to the operation rate of the operation lever, and a control unit controlling a discharge flow rate of the hydraulic pump in accordance with detection signals of the detection sensors, the flow control system including: a first step of detecting the discharge pressure of the hydraulic pump and the operation rate of the operation lever for the hydraulic actuators by the detection sensors; a second step of setting standard load pressures of the hydraulic actuators, respectively; a third step of comparing levels of the discharge pressure of the hydraulic pump and the standard load pressures of the hydraulic actuators with each other; a fourth steps of adjusting coefficients so that the discharge flow rate of the hydraulic pump is proportionally reduced for the same operation rate in accordance with degrees of loads generated by the hydraulic actuators if the discharge pressure of the hydraulic pump is higher than the preset standard load pressures of the hydraulic actuators; and a fifth step of controlling the discharge flow rate of the hydraulic pump in proportion to the operation rate if the discharge pressure of the hydraulic pump is lower than the standard load pressures of the hydraulic actuators.

In accordance with the aspect of the present invention, if a relationship between the operation rate and the discharge flow rate of the hydraulic pump is expressed by an N-th order equation in the fourth step and the discharge pressure of the hydraulic pump is higher than the preset standard load pressure, the discharge flow rate of the hydraulic pump for the same operation rate may be reduced by changing coefficients of the N-th order equation in accordance with the degrees of load generated by the hydraulic actuators.

Even in the case where the coefficients of the N-th order equation are changed in accordance with the degrees of load generated by the hydraulic actuators and the discharge flow rate of the hydraulic pump for the operation rate is reduced, a variation range of the coefficients may be limited so that the maximum flow rate of the hydraulic pump can be discharged for the operation rate that is higher than a predetermined value.

If the discharge pressure of the hydraulic pump is lower than the standard load pressures of the hydraulic actuators in the fifth step, the discharge flow rate of the hydraulic pump may be calculated according to a control flow rate relation Q of the hydraulic pump, $Q=(a\times(\text{operation rate})+b)$, for the preset operation rate.

If the discharge pressure of the hydraulic pump is higher than the standard load pressures of the hydraulic actuators in the fourth step, the discharge flow rate of the hydraulic pump may be calculated according to a control flow rate relation Q of the hydraulic pump, $Q=((a+a')\times(\text{operation rate})+(b+b'))$.

Advantageous Effect

The flow control system of a hydraulic pump for a construction machine as configured above according to the aspect of the present invention has the following advantages.

Since the discharge flow rate of the hydraulic pump is reduced according to the increase of the load pressure of the hydraulic actuators, the pressure loss is reduced to heighten the efficiency and the fuel consumption ratio can be improved.

BRIEF DESCRIPTION OF THE DRAWINGS

The above objects, other features and advantages of the present invention will become more apparent by describing the preferred embodiments thereof with reference to the accompanying drawings, in which.

DESCRIPTION OF REFERENCE NUMERALS IN THE DRAWING

Figure 1:
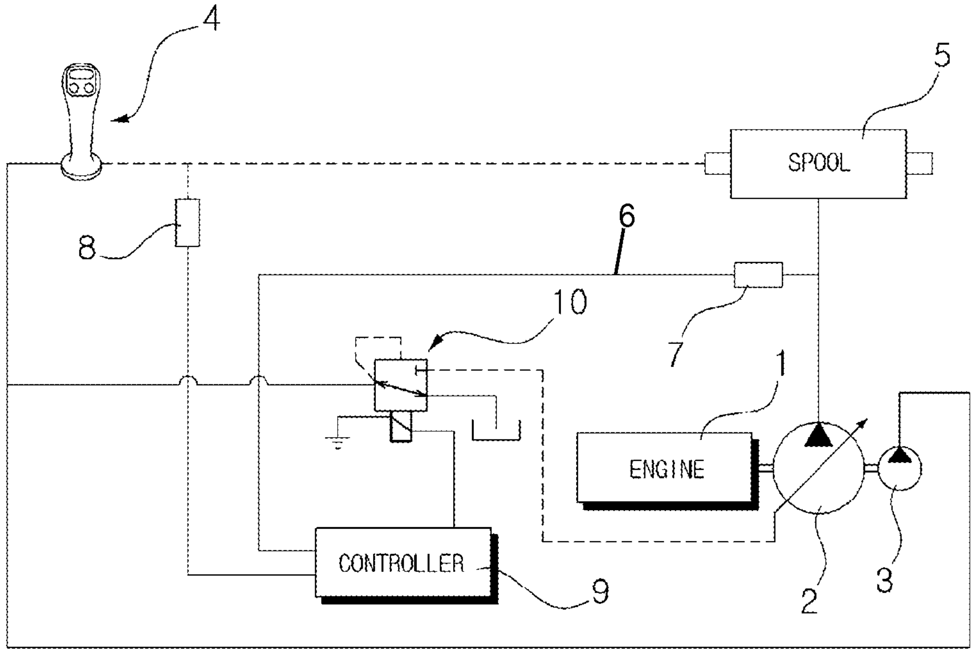
FIG. 1 is a schematic diagram of a hydraulic circuit that is applied to a flow control system of a hydraulic pump for a construction machine according to an embodiment of the present invention.

1: engine
2: variable displacement hydraulic pump
3: pilot pump
4: operation lever
5: spool
6: discharge flow path
7, 8: detection sensor
9: control unit
10: proportional control valve Best Mode Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 2:
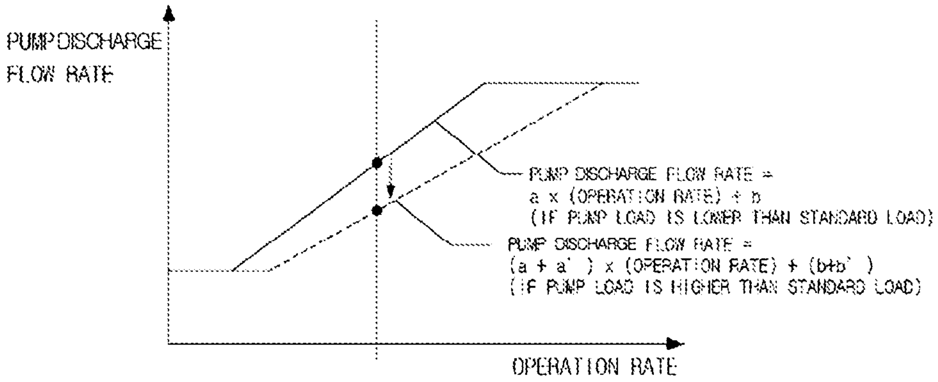
FIG. 2 is a graph showing the relationship between an operation rate and a discharge flow rate in a flow control system of a hydraulic pump for a construction machine according to an embodiment of the present invention.

According to an embodiment of the present invention as illustrated in FIGS. 1 and 2, a flow control system of a hydraulic pump for a construction machine, which has a variable displacement hydraulic pump 2 connected to an engine 1 and a pilot pump 3, at least one hydraulic actuator (a boom cylinder, an arm cylinder, a bucket cylinder, and the like, not illustrated) connected to the hydraulic pump 2, a spool 5 controlling hydraulic fluid supplied to the hydraulic actuator when shifted by signal pressure that is supplied in proportion to an operation rate of an operation lever 4, a detection sensor 7 installed in a discharge flow path 6 of the hydraulic pump 2 to detect discharge pressure of the hydraulic pump 2, a detection sensor 8 detecting pilot signal pressure (secondary signal pressure that shifts the spool 5) according to the operation rate of the operation lever 4, and a control unit 9 controlling a discharge flow rate of the hydraulic pump 2 in accordance with detection signals of the detection sensors 7 and 8, the flow control system, includes a first step S100 of detecting the discharge pressure of the hydraulic pump 2 and the operation rate of the operation lever 4 for the hydraulic actuators by the detection sensors 7 and 8; a second step S200 of setting standard load pressures of the hydraulic actuators, respectively; a third step S300 of comparing levels of the discharge pressure of the hydraulic pump 2 and the standard load pressures of the hydraulic actuators with each other; a fourth steps S400 of adjusting coefficients so that the discharge flow rate of the hydraulic pump 2 is proportionally reduced for the same operation rate in accordance with degrees of loads generated by the hydraulic actuators if the discharge pressure of the hydraulic pump 2 is higher than the preset standard load pressures of the hydraulic actuators; and a fifth step S500 of controlling the discharge flow rate of the hydraulic pump 2 in proportion to the operation rate if the discharge pressure of the hydraulic pump 2 is lower than the standard load pressures of the hydraulic actuators.

If a relationship between the operation rate and the discharge flow rate of the hydraulic pump 2 is expressed by an N-th order equation in the fourth step S400 and the discharge pressure of the hydraulic pump 2 is higher than the preset standard load pressure, the discharge flow rate of the hydraulic pump 2 for the same operation rate is reduced by changing coefficients of the N-th order equation in accordance with the degrees of load generated by the hydraulic actuators.

Even in the case where the coefficients of the N-th order equation are changed in accordance with the degrees of load generated by the hydraulic actuators and the discharge flow rate of the hydraulic pump 2 for the operation rate is reduced, a variation range of the coefficients is limited so that the maximum flow rate of the hydraulic pump 2 can be discharged for the operation rate that is higher than a predetermined value.

If the discharge pressure of the hydraulic pump 2 is higher than the standard load pressures of the hydraulic actuators in the fourth step S400, the discharge flow rate of the hydraulic pump 2 is calculated according to a control flow rate relation Q of the hydraulic pump 2, $Q=((a+a')\times(\text{operation rate})+(b+b'))$.

If the discharge pressure of the hydraulic pump 2 is lower than the standard load pressures of the hydraulic actuators in the fifth step S500, the discharge flow rate of the hydraulic pump 2 is calculated according to a control flow rate relation Q of the hydraulic pump 2, $Q=(a\times(\text{operation rate})+b)$, for the preset operation rate.

In the drawings, the reference numeral 10 denotes a proportional control valve that changes the signal pressure supplied from the operation lever 4 in proportion to a control signal from the control unit 9 in order to control the discharge flow rate of the hydraulic pump 1.

Hereinafter, the use example of the flow control system of a hydraulic pump for a construction machine according to an embodiment of the present invention will be described in detail with reference to the accompanying drawings.

Figure 3:
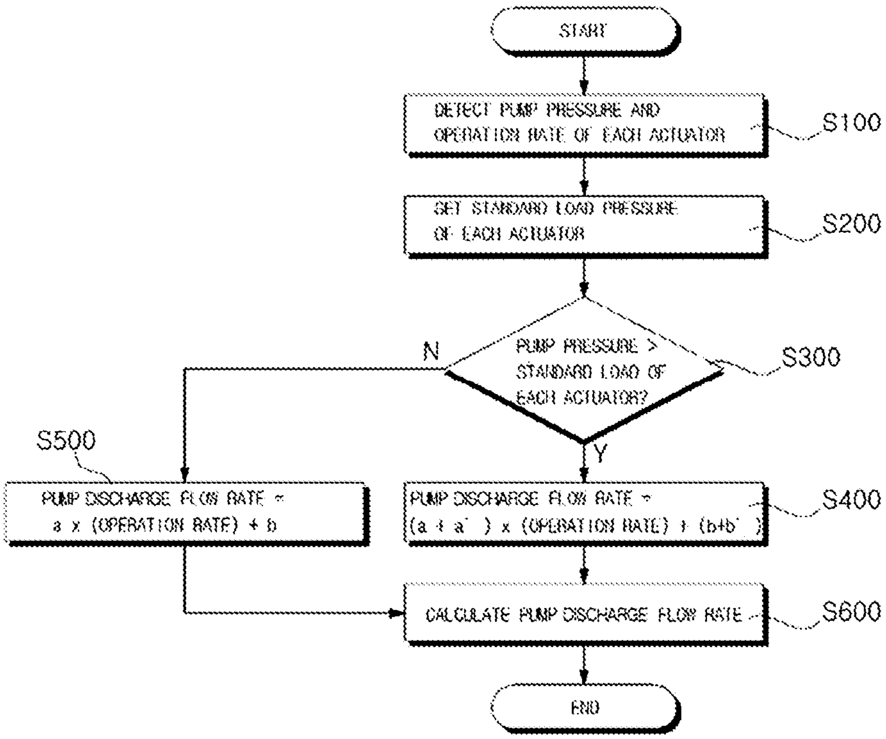
FIG. 3 is a flowchart illustrating the operation of a flow control system of a hydraulic pump for a construction machine according to an embodiment of the present invention.

As shown in FIGS. 2 and 3, the discharge pressure of the hydraulic pump 2 and the operation rate of the operation lever 4 for the hydraulic actuators are detected by the detection sensors 7 and 8 (see S100), and signals of the detected discharge pressure and the operation rate are transferred to the control unit 9.

As in S200, standard load pressures (as an example, in the case of the boom cylinder, 120 $kg/cm^2$) of the hydraulic actuators are set.

As in S300, levels of the discharge pressure of the hydraulic pump 2 and the standard load pressures of the hydraulic actuators are compared with each other. If the discharge pressure of the hydraulic pump 2 is higher than the standard load pressures of the hydraulic actuators, the processing proceeds to the next step (see S400), and if the discharge pressure of the hydraulic pump 2 is lower than the standard load pressures, the processing proceeds to S500.

As in S400, if the discharge pressure of the hydraulic pump 2 is higher than the standard load pressures of the hydraulic actuators, coefficients are adjusted so that the discharge flow rate of the hydraulic pump 2 is proportionally reduced for the same operation rate in accordance with degrees of loads generated by the hydraulic actuators.

That is, as shown as a dotted line in the graph of FIG. 2, the discharge flow rate of the hydraulic pump 2 is calculated using a control flow rate relation Q of the hydraulic pump 2, Q=((a+a')×(operation rate)+(b+b')) (at this time, a denotes a slope of a swash plate for controlling the hydraulic pump, b denotes a slope intercept for controlling the hydraulic pump, a'denotes f (hydraulic pump pressure), f denotes a specified function, b' denotes g (hydraulic pump horsepower), and g denotes a specified function).

That is, by increasing the operation rates at a point where the control flow rate of the hydraulic pump is minimized and at a point where the control flow rate of the hydraulic pump is maximized, the discharge flow rate of the hydraulic pump 2 for the same operation rate is decreased, and thus the pressure and the pressure loss can be reduced.

As in S500, if the discharge pressure of the hydraulic pump 2 is lower than the standard load pressures of the hydraulic actuators, the discharge flow rate of the hydraulic pump 2 is controlled in proportion to the operation rate. That is, as shown as a solid line in the graph of FIG. 2, the discharge flow rate of the hydraulic pump 2 is calculated by applying a control flow rate relation Q of the hydraulic pump 2, Q=(a×(operation rate)+b), for the preset operation rate as it is.

As in S600, the discharge flow rate of the hydraulic pump 2 is calculated according to the control flow rate relations of the hydraulic pump 2 in S400 or S500 as described above.

INDUSTRIAL APPLICABILITY

As apparent from the above description, according to the flow control system of a hydraulic pump for a construction machine according to the embodiment of the present invention, since the discharge flow rate of the hydraulic pump for the same operation rate is reduced according to the increase of the load pressure that is generated by the hydraulic actuator such as the boom cylinder, the loss of pressure is decreased to heighten the efficiency and the fuel consumption ratio can be improved.

The invention claimed is:

1. A flow control system of a hydraulic pump for a hydraulic pump for a construction machine including a variable displacement hydraulic pump, at least one hydraulic actuator connected to the hydraulic pump, a spool controlling hydraulic fluid supplied to the hydraulic actuator when shifted by signal pressure that is supplied in proportion to an operation rate of an operation lever, a detection sensor detecting signal pressure according to the operation rate of the operation lever, and a control unit controlling a discharge flow rate of the hydraulic pump in accordance with detection signals of the detection sensors, the control unit configured to perform the following method:

a first step of detecting the discharge pressure of the hydraulic pump and the operation rate of the operation lever for the hydraulic actuators by the detection sensors;

a second step of setting standard load pressures of the hydraulic actuators, respectively;

a third step of comparing levels of the discharge pressure of the hydraulic pump and the standard load pressures of the hydraulic actuators with each other;

a fourth step of adjusting coefficients so that the discharge flow rate of the hydraulic pump is reduced in proportion to the operation rate in accordance with degrees of loads generated by the hydraulic actuators if the discharge pressure of the hydraulic pump is higher than the preset standard load pressures of the hydraulic actuators; and a fifth step of controlling the discharge flow rate of the hydraulic pump in proportion to the operation rate if the discharge pressure of the hydraulic pump is lower than the standard load pressures of the hydraulic actuators;

wherein if a relationship between the operation rate and the discharge flow rate of the hydraulic pump is expressed by a flow rate relation equation in the fourth step and the discharge pressure of the hydraulic pump is higher than the preset standard load pressure, the discharge flow rate of the hydraulic pump for the same operation rate is reduced by changing coefficients of the flow rate relation equation in accordance with the degrees of load generated by the hydraulic actuators; and wherein if the discharge pressure of the hydraulic pump is higher than the standard load pressures of the hydraulic actuators in the fourth step, the discharge flow rate of the hydraulic pump is calculated according to a flow rate Q of the hydraulic pump of the control flow rate relation equation, Q=((a+a')×(operation rate)+(b+b')), wherein "a" is a slope of a swash plate for controlling the hydraulic pump, "b" is a slope intercept for controlling the hydraulic pump, "a" is hydraulic pump pressure, and "b'" is hydraulic pump horsepower.

2. The flow control system of a hydraulic pump for a construction machine according to claim 1, wherein even in the case where the coefficients of the flow rate relation equation are changed in accordance with the degrees of load generated by the hydraulic actuators and the discharge flow rate of hydraulic pump for the operation rate is reduced, a variation range of the coefficients is limited so that the maximum flow rate of the hydraulic pump can be discharged for the operation rate that is higher than a predetermined value.

3. The flow control system of a hydraulic pump for a construction machine according to claim 1, wherein if the discharge pressure of the hydraulic pump is lower than the standard load pressures of the hydraulic actuators in the fifth step, the discharge flow rate of the hydraulic pump is calculated according to a control flow rate relation Q of the hydraulic pump, Q=(a×(operation rate)+b), for the preset operation rate, wherein "a" denotes a slope of a swash plate for controlling the hydraulic pump and "b" denotes a slope intercept for controlling the hydraulic pump.

4. A flow control system of a hydraulic pump of a construction machine including a control unit configured to perform the following method:

detecting discharge pressure of the hydraulic pump and operation rate of an operation level for hydraulic actuators using detection sensors;

setting standard load pressures of the hydraulic actuators;

comparing discharge pressure of the hydraulic pump with standard load pressures of the hydraulic actuators;

reducing the discharge flow rate of the hydraulic pump in proportion to the operation rate according to degrees of loads generated by the hydraulic actuators if the discharge pressure of the hydraulic pump is higher than preset standard load pressures of the hydraulic actuators;

controlling the discharge flow rate of the hydraulic pump in proportion to the operation rate if the discharge pressure of the hydraulic pump is lower than the preset standard load pressures of the hydraulic actuators;

wherein if a relationship between the operation rate and the discharge flow rate of the hydraulic pump is expressed by a flow rate relation equation and the discharge pressure of the hydraulic pump is higher than the preset standard load pressures, the discharge flow rate of the hydraulic pump for the same operation rate is reduced by changing coefficients of the flow rate relation equation in accordance with the degrees of loads generated by the hydraulic actuators; and wherein if the discharge pressure of the hydraulic pump is higher than the preset standard load pressures of the hydraulic actuators, the discharge flow rate of the hydraulic pump is calculated according to a flow rate Q of the hydraulic pump of the control flow rate relation equation, Q=((a+a')×(operation rate)+(b+b')), wherein "a" is a slope of a swash plate for controlling the hydraulic pump, "b" is a slope intercept for controlling the hydraulic pump, "a'" is hydraulic pump pressure, and "b'"is hydraulic pump horsepower.

5. The flow control system of claim 4, wherein when the coefficients of the flow rate relation equation are changed in accordance with the degrees of load generated by the hydraulic actuators and the discharge flow rate of the hydraulic pump for the operation rate is reduced, a variation range of the coefficients is limited so that the maximum flow rate of the hydraulic pump can be discharged for the operation rate that is higher than a predetermined value.

6. The flow control system of claim 4, wherein when the discharge pressure of the hydraulic pump is lower than the standard load pressures of the hydraulic actuators in the fifth step, the discharge flow rate of the hydraulic pump is calculated according to a control flow rate relation Q of the hydraulic pump, Q=(a×(operation rate)+b), for the operation rate, wherein "a" denotes a slope of a swash plate for controlling the hydraulic pump and "b" denotes a slope intercept for controlling the hydraulic pump.

* * * * *